(12) United States Patent
Alkhaldi et al.

(10) Patent No.: US 10,679,280 B2
(45) Date of Patent: Jun. 9, 2020

(54) MOBILE AUTOMATED STORAGE AND RETRIEVAL VEHICLE, ASSOCIATED SYSTEMS, AND OPERATING PLATFORM FOR ON-DEMAND ELECTRONIC COMMERCE

(71) Applicants: Abdullah Hassan Alkhaldi, Mississauga (CA); Omar Amin Al Sati, Mississauga (CA)

(72) Inventors: Abdullah Hassan Alkhaldi, Mississauga (CA); Omar Amin Al Sati, Mississauga (CA)

( * ) Notice: Subject to any disclaimer, the term of this patent is extended or adjusted under 35 U.S.C. 154(b) by 0 days.

(21) Appl. No.: 15/945,459

(22) Filed: Apr. 4, 2018

(65) Prior Publication Data

US 2018/0297781 A1 Oct. 18, 2018

Related U.S. Application Data

(63) Continuation-in-part of application No. 15/406,865, filed on Jan. 16, 2017, now abandoned.

(60) Provisional application No. 62/573,907, filed on Oct. 18, 2017, provisional application No. 62/279,212, filed on Jan. 15, 2016.

(51) Int. Cl.
| | |
|---|---|
| *G06Q 30/06* | (2012.01) |
| *B25J 9/16* | (2006.01) |
| *B60P 3/00* | (2006.01) |
| *B65G 1/137* | (2006.01) |
| *G05B 15/02* | (2006.01) |
| *G05D 1/02* | (2020.01) |
| *G06Q 10/08* | (2012.01) |

(52) U.S. Cl.
CPC ......... *G06Q 30/0639* (2013.01); *B25J 9/162* (2013.01); *B25J 9/1679* (2013.01); *B60P 3/00* (2013.01); *B60P 3/007* (2013.01); *B65G 1/137* (2013.01); *B65G 1/1375* (2013.01); *G05B 15/02* (2013.01); *G05D 1/0285* (2013.01); *G06Q 10/083* (2013.01); *G06Q 10/087* (2013.01); *G06Q 30/0603* (2013.01); *G06Q 30/0635* (2013.01); *G05B 2219/40006* (2013.01); *G05D 2201/0213* (2013.01)

(58) Field of Classification Search
CPC .... B65G 1/1375; B60P 3/007; G06Q 30/0639
See application file for complete search history.

(56) References Cited

U.S. PATENT DOCUMENTS

| | | | | |
|---|---|---|---|---|
| 5,106,259 A | * | 4/1992 | Anderson | B65G 65/00 414/273 |
| 5,532,521 A | * | 7/1996 | Leininger | B60P 3/03 307/10.2 |
| 9,412,280 B1 | * | 8/2016 | Zwillinger | G08G 5/0069 |

(Continued)

*Primary Examiner* — Thomas Randazzo
(74) *Attorney, Agent, or Firm* — Ridout & Maybee LLP

(57) ABSTRACT

An automated fulfillment unit for a mobile storage and retrieval system, configured for dispensing products on the move for on-demand electronic commerce to enable increased operational capacity and speed of delivery to customer orders. The mobile automated fulfillment unit includes a vehicle having a storage for storing products and having a compartment separate from the storage, a robotic conveyor mechanism configured to move products from the storage to compartment, and a communication subsystem configured for at least mobile communication and for receiving customer orders.

26 Claims, 6 Drawing Sheets

(56) References Cited

U.S. PATENT DOCUMENTS

| | | | |
|---|---|---|---|
| 9,598,238 B2* | 3/2017 | Kadaba | B65G 67/04 |
| 10,148,918 B1* | 12/2018 | Seiger | G06Q 10/087 |
| 10,233,021 B1* | 3/2019 | Brady | G01C 21/3407 |
| 2005/0080689 A1* | 4/2005 | Liberman | A47G 29/141 |
| | | | 705/28 |
| 2005/0263337 A1* | 12/2005 | Corey | B60N 2/14 |
| | | | 180/318 |
| 2008/0036238 A1* | 2/2008 | Weeda | B60P 3/20 |
| | | | 296/146.1 |
| 2008/0129446 A1* | 6/2008 | Vader | B60R 25/24 |
| | | | 340/5.6 |
| 2010/0073131 A1* | 3/2010 | Martin | E05F 15/70 |
| | | | 340/5.64 |
| 2012/0030133 A1* | 2/2012 | Rademaker | G06Q 10/08 |
| | | | 705/333 |
| 2012/0084121 A1* | 4/2012 | Campbell | G06Q 10/02 |
| | | | 705/7.35 |
| 2014/0054916 A1* | 2/2014 | Knudtson | B60P 3/007 |
| | | | 296/24.3 |
| 2014/0129951 A1* | 5/2014 | Amin | G06Q 50/30 |
| | | | 715/738 |
| 2015/0006005 A1* | 1/2015 | Yu | G06Q 50/28 |
| | | | 701/22 |
| 2015/0210199 A1* | 7/2015 | Payne | G06Q 10/08 |
| | | | 701/1 |
| 2016/0090248 A1* | 3/2016 | Worsley | B65G 67/08 |
| | | | 414/398 |
| 2016/0239803 A1* | 8/2016 | Borley | G06Q 10/0833 |
| 2016/0379157 A1* | 12/2016 | Nassar | H04W 4/80 |
| | | | 705/337 |
| 2017/0154347 A1* | 6/2017 | Bateman | G06Q 30/0202 |
| 2018/0170674 A1* | 6/2018 | Luckay | B65G 1/137 |
| 2019/0035044 A1* | 1/2019 | Ferguson | G06K 9/00201 |

* cited by examiner

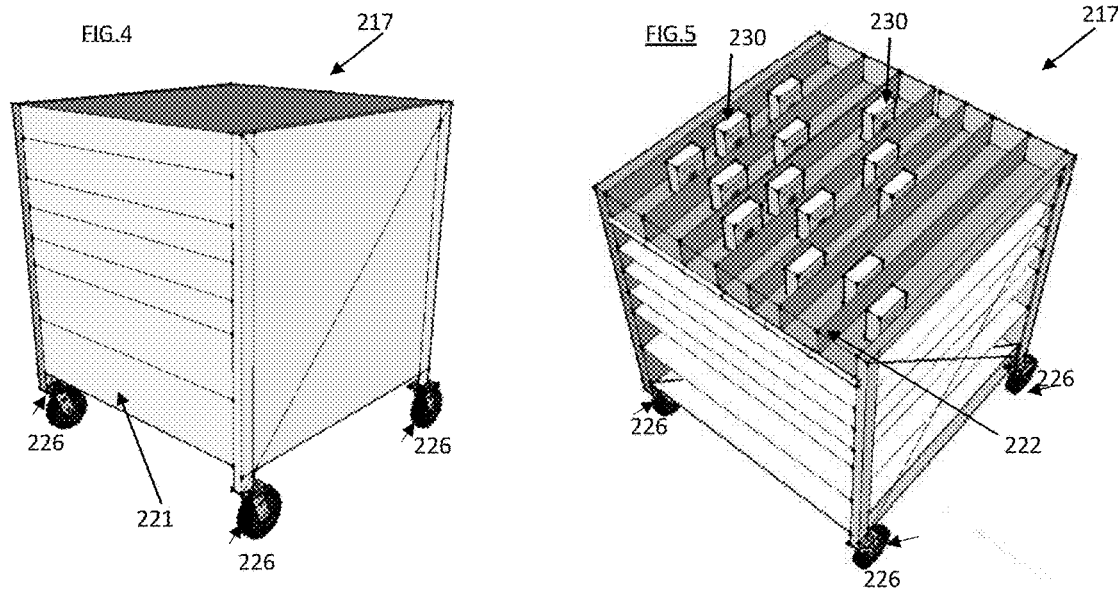
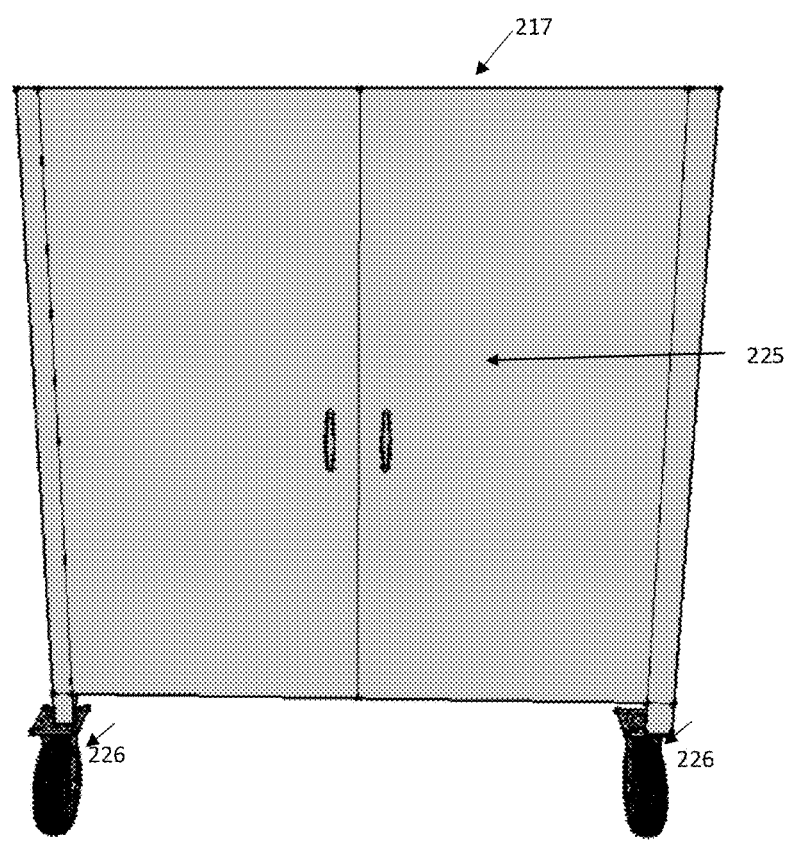

MOBILE AUTOMATED STORAGE AND RETRIEVAL VEHICLE, ASSOCIATED SYSTEMS, AND OPERATING PLATFORM FOR ON-DEMAND ELECTRONIC COMMERCE

CROSS-REFERENCE TO RELATED APPLICATIONS

This application claims the benefit of priority to U.S. Provisional Patent Application No. 62/573,907 filed Oct. 18, 2017 and entitled AUTONOMOUS MOBILE AUTOMATED STORAGE AND RETRIEVAL SYSTEM AND OPERATING MODEL FOR ON-DEMAND ELECTRONIC COMMERCE. This application is also a continuation-in-part of U.S. patent application Ser. No. 15/406,865 filed Jan. 16, 2017 entitled AUTONOMOUS MOBILE AUTOMATED STORAGE AND RETRIEVAL SYSTEM AND OPERATING MODEL FOR ON-DEMAND ELECTRONIC COMMERCE, which claims the benefit of priority to U.S. Provisional Patent Application No. 62/279,212 filed Jan. 15, 2016 and entitled MOBILE AUTOMATED STORAGE AND RETRIEVAL SYSTEM AND OPERATING MODEL FOR ON-DEMAND ELECTRONIC COMMERCE. All of these applications are herein incorporated by reference in their entirety into the DETAILED DESCRIPTION OF EXAMPLE EMBODIMENTS, herein below.

TECHNICAL FIELD

Example embodiments generally relate to mobile automated storage and retrieval vehicles, and in particular such vehicles and related systems for last mile delivery.

BACKGROUND

Some existing e-commerce operational systems have costly operation in order to provide fulfillment and last mile delivery, resulting in low or negative operating margins. In logistics, automated storage and retrieval systems are often limited to fixed environments such as static fulfillment centers, warehouses and static distribution centers.

Some e-commerce companies are adopting a model where they are renting floors in high density downtowns and converting them into warehousing facilities to minimize distance traveled to deliver products. However, delivering per-order from fixed fulfillment centers can result in additional inefficiencies, costs and delays in delivery times.

Additional difficulties may be appreciated in view of the Detailed Description of Example Embodiments, herein below.

SUMMARY

Example embodiments generally relate to mobile automated storage and retrieval systems. For example, a mobile automated fulfillment unit can have generic inventory that is readily available to be delivered to the customer to fulfill a customer order.

Example embodiments of the system are directed to improving efficiency and speed of on-demand e-commerce by using mobile automated fulfillment units in addition to efficient operating models to fulfill customer orders.

Example embodiments of the system combine automated order fulfillment with last mile delivery in one operation, which may result in faster delivery and lower cost operation for e-commerce order fulfillment and delivery.

An example embodiment of the mobile automated fulfillment unit includes a vehicle having a storage for storing products and having a compartment separate from the storage, a robotic conveyor mechanism configured to move products from the storage to compartment, and a communication subsystem configured for at least mobile communication and for receiving customer orders.

An example embodiment is a mobile automated fulfillment unit, comprising: a vehicle having a storage for storing products, a wall, and a compartment separated from the storage by the wall; a robotic conveyor mechanism; a communication subsystem configured for at least mobile communication; and at least one controller configured to: receive through the communication subsystem a customer order for a delivery destination that is within a specified range of a present location of the vehicle, the customer order including: identification of one or more of the products, and the delivery destination of the one or more products. The controller is further configured to control the robotic conveyor mechanism to move the one or more products from the storage to the compartment, verify that the vehicle has reached the delivery destination and that the one or more products have been removed from the vehicle, and transmit information that the one or more products or no longer contained in the vehicle.

In an example embodiment of any of the above, the robotic conveyor mechanism is controlled at least partly when the vehicle is moving.

In an example embodiment of any of the above, the robotic conveyor mechanism comprises a robotic arm.

In an example embodiment of any of the above, the mobile automated fulfillment unit further comprises a vertical track and/or a horizontal track in the storage, wherein the robotic arm is controllable to move along the vertical track and/or the horizontal track in the storage.

In an example embodiment of any of the above, the robotic arm comprises a horizontally flat support surface.

In an example embodiment of any of the above, wherein the robotic arm comprises a basket shaped container.

In an example embodiment of any of the above, the mobile automated fulfillment unit further comprises one or more product racks in the storage, each product rack comprising shelves for storing of the products, each of the product racks being individually removable from the storage of the vehicle.

In an example embodiment of any of the above, each shelf comprises at least one conveyor belt for moving one or more of the products.

In an example embodiment of any of the above, the at least one controller is further configured to identify and control each respective conveyor belt that stores each of the identified products.

In an example embodiment of any of the above, the at least one controller is further configured to identify which shelf of which product rack stores each of the identified products, for said moving of the one or more products from the storage to the compartment.

In an example embodiment of any of the above, each product rack comprises wheels.

In an example embodiment of any of the above, the customer order is received from a server.

In an example embodiment of any of the above, the information that the one or more products or no longer contained in the vehicle is transmitted to a server.

In an example embodiment of any of the above, the compartment is located at a front of the vehicle.

In an example embodiment of any of the above, the mobile automated fulfillment unit further comprises a window at the wall for access to the compartment from the storage.

In an example embodiment of any of the above, the vehicle further comprises a driver cabin, and wherein the compartment is located in the driver cabin.

In an example embodiment of any of the above, the specified range comprises a specified distance from the vehicle.

In an example embodiment of any of the above, the specified range comprises a specified time of travel of the vehicle to the delivery destination.

In an example embodiment of any of the above, the vehicle is an autonomous vehicle, wherein the at least one controller is further configured to control the vehicle to move to the delivery destination.

Another example embodiment is a mobile automated storage and retrieval system, comprising: a plurality of mobile automated fulfillment units; a server including a communication subsystem, memory and at least one processor, the server configured to: determine a delivery destination of a computer device, determine which mobile automated fulfillment units are within a specified range of the delivery destination, determine which products are stored in the determined mobile automated fulfillment units that are within the specified range, transmit to the computer device a communication that identifies at least one of the determined products that are within the specified range, receive a customer order for one or more products of the determined products that are within the specified range, transmit the customer order, including the delivery destination, to at least one of the mobile automated fulfillment units, and receive, after delivery of the one or more products, information from one of the mobile automated fulfillment units that the one or more products or no longer contained in the mobile automated fulfillment unit, wherein at least one of the plurality of mobile automated fulfillment units is any of the mobile automated fulfillment units as described herein.

In an example embodiment, the server is a cloud server.

Another example embodiment is a method for controlling a mobile automated fulfillment unit, the mobile automated fulfillment unit including a vehicle having a storage for storing products, a wall, a compartment separated from the storage by the wall, a robotic conveyor mechanism, and a communication subsystem configured for at least mobile communication. The method is performed by at least one controller and comprises: receiving through the communication subsystem a customer order for a delivery destination that is within a specified range of a present location of the vehicle, the customer order including: identification of one or more of the products, and the delivery destination of the one or more products; controlling the robotic conveyor mechanism to move the one or more products from the storage to the compartment; verifying that the vehicle has reached the delivery destination and that the one or more products have been removed from the vehicle; and transmitting information that the one or more products or no longer contained in the vehicle.

BRIEF DESCRIPTION OF THE DRAWINGS

Reference will now be made, by way of example, to the accompanying drawings which show example embodiments of the present application, and in which:

FIG. 4 illustrates a front perspective view of a product rack for use with the mobile automated fulfillment unit of FIG. 2, in accordance with an example embodiment;

FIG. 5 illustrates a cutaway perspective view of the product rack of FIG. 4;

FIG. 6 illustrates a rear view of the product rack of FIG. 4;

DETAILED DESCRIPTION OF EXAMPLE EMBODIMENTS

Figure 10:
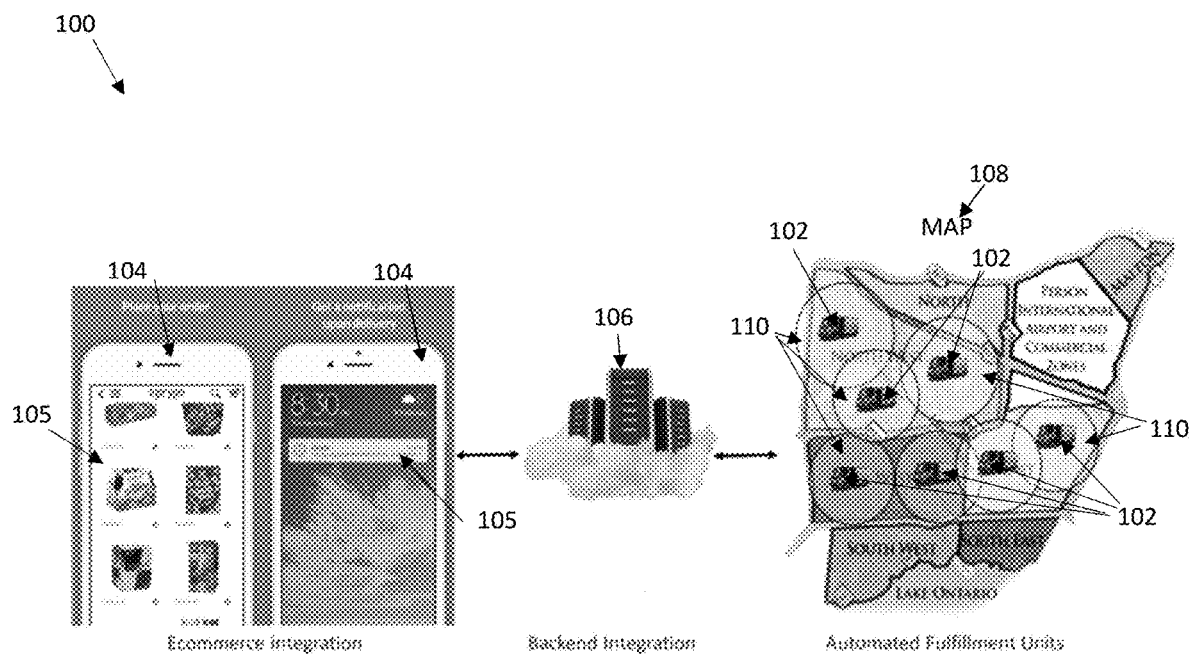
FIG. 10 illustrates a diagrammatic view of the system of FIG. 1.

Reference is first made to FIG. 10, which illustrates a mobile automated storage and retrieval system 100 having order placement, order delivery and inventory replenishment, in accordance with an example embodiment. The system 100 includes one or more mobile automated fulfillment units 102 (also known as mobile automated storage and retrieval units), that can each be an automated vehicle in an example embodiment. Each mobile automated fulfillment unit 102 includes on-board generic (unallocated) inventory stored thereon that can be delivered to customers on-demand and upon real-time requests. Customers can place their orders using a computer device such as mobile communication device 104, that has a suitable application or "app" loaded on the mobile communication device 104. The mobile communication device 104 can be configured to an order with cloud server 106, and the cloud server 106 communicates with the mobile automated fulfillment unit 102 to fulfill the order if there is sufficient inventory.

Still referring to FIG. 10, a map 108 is illustrated to demonstrate a specific respective range 110 for each of the mobile automated fulfillment units 102, in an example embodiment. For example, each of the mobile automated fulfillment units 102 can be mobile around their respective locations, or can be currently fulfilling a customer order. Each mobile automated fulfillment unit 102 can have defined a particular range 110 (e.g. radius) that can be fulfilled by that mobile automated fulfillment unit 102 if a customer or the associated mobile communication device 104 is located within that range 110. In other example embodiments, the range 110 is based on a specified estimated time of delivery, e.g., based on current delivery schedule of the mobile automated fulfillment unit 102, current location of the mobile automated fulfillment unit 102, delivery destination location, road speed limits, and/or traffic conditions, etc.

As can be seen on the map 108, more than one range 110 can overlap, which means that more than one mobile automated fulfillment unit 102 can potentially service a given customer. If a customer exceeds all of the ranges 110, in an example embodiment, the closest mobile automated fulfillment unit 102 can be instructed to fulfill the order. In other example embodiments, it may be determined by the cloud server 106 that no fulfillment is possible and a corresponding message is sent to the mobile communication device 104 and/or the message is displayed on the mobile communication device 104.

The mobile communication device 104 can be a computer device having a user interface 105, also known as customer interface. The user interface 105 can be, for example a touch screen, keyboard or keypad, display screen and/or speaker. The mobile communication device 104 can include one or more processors or controllers. The mobile communication device 104 can include a communication subsystem for wireless and/or wired communication. The mobile communication device 104 can be a mobile phone, a mobile tablet, a home-based speaker assistant such as Amazon™ Alexa or Google™ Home, a wireless enabled laptop computer, an on-board vehicle computer, etc. The mobile communication device 104 comprises a Global Positioning System (GPS) in an example embodiment.

The cloud server 106 can represent one or more servers. The cloud server 106 can include one or more processor or controllers, and one or more communication subsystems for communicating over one or more networks. The cloud server 106 can be configured to communicate over one or more networks, such as the Internet, public networks, private networks, and Public Land Mobile Networks (PLMN).

When a mobile automated fulfillment unit 102 runs out of some or all of its inventory, it may reload only those missing products by going to one or more stock reloading stations 112, as shown on the map 108. The stock reloading stations 112 can be centrally loaded in some example embodiments, and can be externally located to the specified delivery zones in some example embodiments.

In some example embodiments, each of the mobile automated fulfillment units 102 can be configured to have climate controlled capability (e.g., −18 C to 50 C). In an example embodiment, the mobile automated fulfillment units 102 are self-driven (autonomous). In an example embodiment, the mobile automated fulfillment units 102 are fully autonomous, where all order receipt, mobility, product fulfillment, delivery, and customer verification are performed end-to-end autonomously. In an example embodiment, driving of the mobile automated fulfillment units 102 is done by humans. In an example embodiment, the mobile automated fulfillment units 102 are semi-autonomous, in that they may be autonomously driven, or at least some aspects may be autonomously driven, and a human driver can manually drive the mobile automated fulfillment units 102 when necessary.

Figure 2:
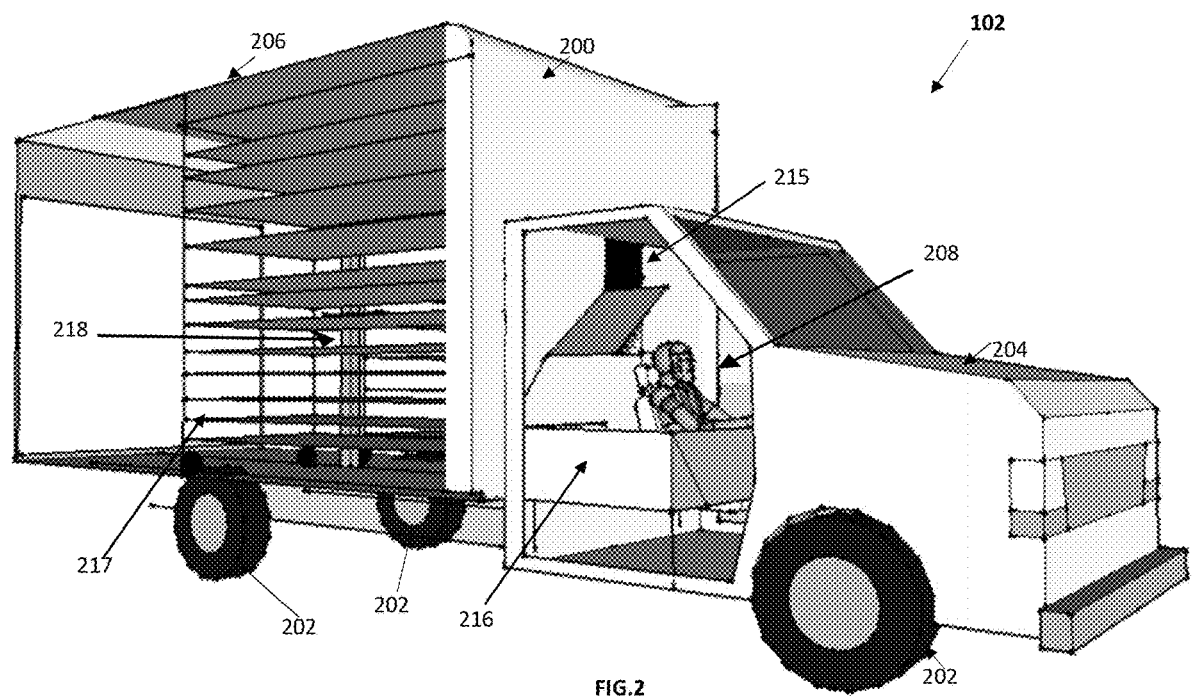
FIG. 2 illustrates a cutaway front perspective view of a mobile automated fulfillment unit for the system of FIG. 1, in accordance with an example embodiment.

Reference is now briefly made to FIG. 2, which illustrates an example mobile automated fulfillment unit 102, in accordance with an example embodiment. The mobile automated fulfillment unit 102 includes a vehicle such as a truck 200, that includes, for example, wheels 202, an engine 204, truck box 206, driver cabin 215, and one or more processors or controllers, and one or more communication subsystems (not specifically shown). The processors or controllers are configured for controlling logical and electromechanical aspects of the mobile automated fulfillment unit 102.

A driver 208 is used to drive the truck 200. The driver 208, can be a human being in some example embodiments, or a computer (e.g. autonomous) in some other example embodiments. The driver cabin 215 is located at the front of the truck 200, for example. A compartment, shown as truck cabin collection box 216, is separate from the truck box 206 and located in the driver cabin 215. The truck box 206 contains a plurality of removable product racks 217 that carry products 230. A robotic conveyor mechanism such as a robotic arm 218 is configured to carry the product(s) 230 from the product racks 217 to the truck cabin collection box 216.

In example embodiments, the engine 204 of the truck 200 is powered by fuel and/or a battery. In an alternate example embodiment, the vehicle is a manned or unmanned aerial vehicle (not shown), that does not necessarily require any wheels for mobility. Rather, aerial propulsion or propeller systems are used for mobility.

Figure 1:
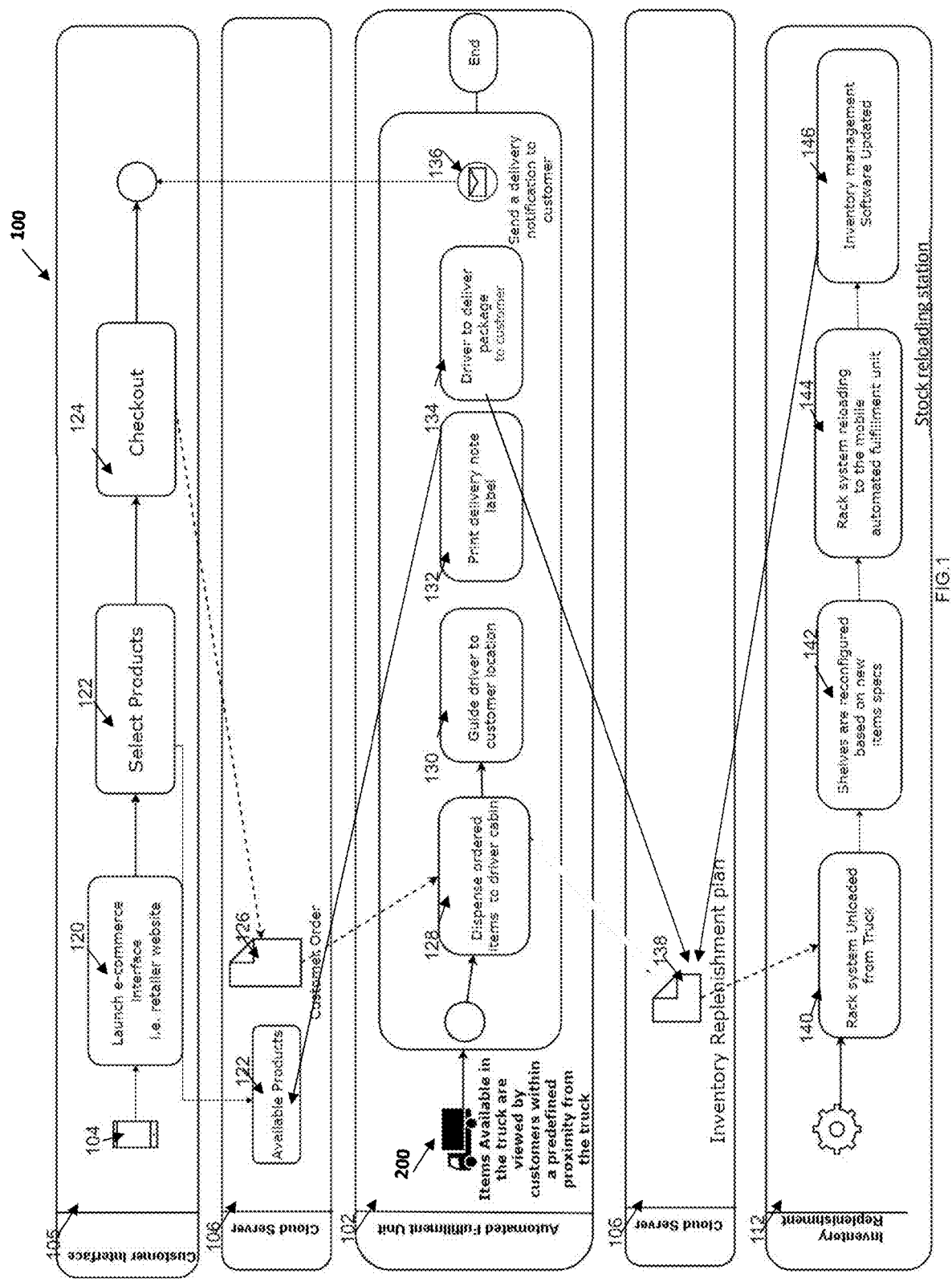
FIG. 1 illustrates a logical flow diagram of a mobile automated storage and retrieval system, in accordance with an example embodiment.

FIG. 1 illustrates a logical flow diagram of the mobile automated storage and retrieval system 100. FIG. 1 includes modules of the mobile communication device 104, the cloud server 106, the mobile automated fulfillment unit 102, and the stock reloading station 112. FIG. 1 illustrates example embodiments of order placing, order fulfillment, and inventory replenishment.

The user interface 105 for order placing will now be describe in greater detail. At module 120, the customer launches the user interface 105 on their mobile device 104. The user interface 105 can comprise an e-commerce interface for the customer to place an order for one or more products. In an example embodiment, the e-commerce interface can be integrated with any existing retailer e-commerce engine.

The user interface 105 takes into consideration the customer location, for example using the GPS of the mobile device 104, or the location being manually input or previously stored in memory as a preference by the customer, or using the IP address. At module 122, based on the customer location, the cloud server 106 sends information on the available products, for example based on the range 110 of the particular mobile automated fulfillment units 102 and their available onboard generic inventory. After the available product information is received by the mobile device 104, the mobile device 104 is configured to show specific available products of the mobile automated fulfillment units 102. In other words, the customer will only be able to see the products available from any of the automated fulfillment units that are within a within a specific proximity e.g. 6 kilometers. In other example embodiments, the available products are based on time of delivery, e.g. 15 minutes on current delivery schedule of the particular mobile automated fulfillment units 102. At module 122, the customer selects products through a standard e-commerce process. At module 124, the customer may then checkout and provide payment through a standard e-commerce process. At module 126, the cloud server 106 receives and processes the customer order 126.

Referring again to FIG. 1, order fulfillment will now be described. From module 126, the placed customer order is sent from the cloud server 106 to the mobile automated fulfillment unit 102. In an example embodiment, the driver 208 confirms acceptance of the customer order of module 125. The product(s) are stored in generic storage in the truck box 206. Once accepted, the mobile automated fulfillment unit 102 automatically and autonomously dispenses the requested product or products. The requested product(s) are automatically and autonomously moved from the truck box 206 to the truck cabin collection box 216 (at module 128). The truck cabin collection box 216 can be located at the front of the mobile automated fulfillment unit 102 (e.g. vehicle front seat). In an example embodiment, the truck cabin collection box 216 is physically separated from the generic inventory of the truck box 206 using a wall, and can further include a one-way flap (not shown). The one-way flap can comprise at least one flap and at least one hinge that are configured to permit products 230 to move from the truck box 206 to the truck cabin collection box 216, but not vice versa. At module 122, the available products are tentatively allocated to the customer, and the cloud server 106 is notified so that available products in the inventory of the mobile automated fulfillment unit 102 are not double assigned when a delivery is in progress.

At module 130, the mobile automated fulfillment unit 102 is guided to the customer location (in various example embodiments, either with manual directions or autonomously). In example embodiments, the mobile communication device 104 is provided with real-time co-ordinates (e.g. on a map) and/or the Estimated Time of Arrival (ETA) of the mobile automated fulfillment unit 102. The navigation information can be sent to a computer device of the mobile automated fulfillment unit 102. The navigation information can be optimized based on traffic and road conditions, and can be dynamically adjusted while the mobile automated fulfillment unit 102 is on-route.

At module 132, one or more delivery note labels are printed to be labelled onto the product(s). In an example embodiment, the delivery note label is affixed to the product 230 when placed in the truck cabin collection box 216. In various example embodiments, the delivery note label can then be manually or automatically affixed to the product 230. At module 134, the product is conveniently retrieved by the driver 208 at the truck cabin collection box 216, located at a front driver cabin 215 of the mobile automated fulfillment unit 102 next to the driver 208, and the driver 208 hand-delivers the product 230 to the customer. Alternatively, the customer retrieves the product 230 from the truck cabin collection box 216 of the mobile automated fulfillment unit 102, wherein the truck cabin collection box 216 is physically separated from the remaining inventory for anti-theft purposes. At module 136, once the product(s) 230 are successfully delivered to the customer, a delivery notification is sent to the mobile communication device 104 of the customer. The notification can be through the user interface 105 and/or through an alternate channel such as e-mail, or short message service (SMS), etc. Once the product 230 has left the mobile automated fulfillment unit 102, at module 138, the cloud server 106 is notified and calculates stock refill information, and sends the stock refill information to the stock reloading station 112. Also, the available products (module 122) are updated in the cloud server 106 for that particular mobile automated fulfillment unit 102, so that a next customer order will have the most recent available inventory information. Note that one or more further customer orders can be allocated to the mobile automated fulfillment unit 102 while it is on-route to the customer. This can be performed with particular service standards being programmed in the cloud server 106, such as time of delivery.

The inventory replenishment at the stock reloading station 112 will now be described. Generally, a rack system is used in the system 100, wherein each mobile automated fulfillment unit 102 carries a plurality of product racks 217, and each product rack 217 contains one or more of the products 230 of generic on-board inventory. For ease and speed of inventory replenishment, entire product racks 217 are replaced so that the mobile automated fulfillment unit 102 can speedily restock the products 230 so as to proceed to its subsequent designated area or to a specific customer for delivery. At module 138, the cloud server 106 determines the inventory replacement plan.

A mobile automated fulfillment unit 102 goes to the stock reloading station 112 when it requires refilling of one or more products 230 for its generic inventory, or when a shift of the driver 208 ends, for example. At module 140, one or more product racks 217 are unloaded from the mobile automated fulfillment unit 102. At module 142, shelves of the product racks 217 can be reconfigured as necessary, and inventory is reloaded onto the product racks 217. Module 142 can be manual, automated, or a combination of manual and automated. When products 230 are loaded physically onto the product racks 217, the products may be barcode scanned using a scanner to identify product details and bin locations, and the available quantities per mobile automated fulfillment unit 102 are therefore known. These details are sent and stored on the cloud server 106 and then used for the customer front end user interface 105.

At module 144, the product racks 217 are reloaded back onto the mobile automated fulfillment unit 102. At module 146, the inventory of the mobile automated fulfillment unit 102 and the stock reloading station 112 are updated. In example embodiments, it may be appreciated that less than all of the product racks 217 may need to be replaced for a given reload at the stock reloading station 112. In some example embodiments, an extra product rack 217 may be previously loaded at the stock reloading station 112 to include the products 230 needed by the mobile automated fulfillment unit 102 while the mobile automated fulfillment unit 102 is on its way to the stock reloading station 112. Therefore, the entire product racks 217 can be swapped out once the mobile automated fulfillment unit 102 arrives. The product rack 217 that is removed from the mobile automated fulfillment unit 102 can be used for a future swap out, with the same or with a different mobile automated fulfillment unit 102.

The particular decision by the inventory replenishment plan (module 138) on which products 230 are to be replenished at each product rack 217 can be based on at least one or all of: historical demand, demographics, geography, machine learning, etc. The inventory for the mobile automated fulfillment unit 102 is typically generic inventory and considered unassigned inventory, until a particular order is received after the mobile automated fulfillment unit 102 leaves the stock reloading station 112.

The stock reloading station 112 can include a computer terminal located at a warehouse, in some example embodiments. The stock reloading station 112 can include one or more processors or controllers for controlling logical and electromechanical aspects of the stock reloading station 112. The stock reloading station 112 can include manual, autonomous, or a combination of manual and autonomous refilling of the products 230 in the product racks 217, in some example embodiments. The stock reloading station 112 can include manual, autonomous, or a combination of manual and autonomous loading and unloading of the product racks 217 from the truck 200.

Figure 3:
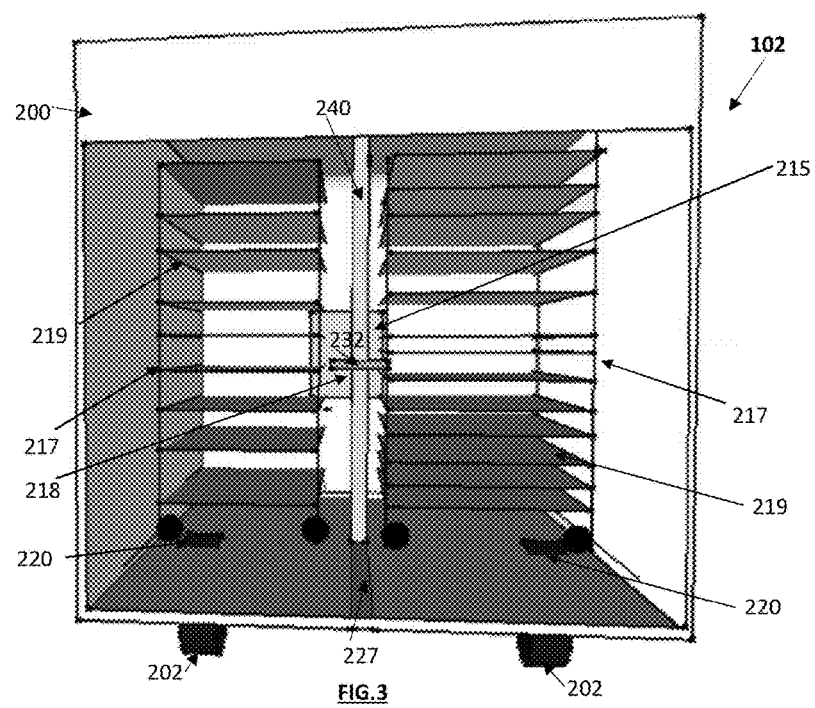
FIG. 3 illustrates a cutaway rear view of the mobile automated fulfillment unit of FIG. 2.

FIG. 3 illustrates a rear cutaway view of the mobile automated fulfillment unit 102. Referring to FIGS. 2 and 3, the order fulfillment at the mobile automated fulfillment unit 102 will now be described in greater detail. The products 230 to be dispensed from the product racks 217 are carried by the robotic arm 218 and put through a window opening between the truck box 206 and the driver cabin 215, to the truck cabin collection box 216. For example, this can take place while the truck 200 is moving and on-route to its delivery destination. The driver 208 is notified through the module 130, for example on a dashboard, screen or global positioning system (GPS), as to the navigation information. The navigation can comprise the address or GPS co-ordinates of the destination in some example embodiments. In some example embodiments, the navigation information comprises how to navigate (drive) to the delivery destination, for example real-time step-by-step directions, turns, etc. In some example embodiments, the navigation information can be sent to such a device that is onboard the truck 200 or to the driver's own mobile communication device (e.g. smart phone). When the driver 208 is at the destination he can hand-deliver the ordered package(s) 230 to the customer. Once delivery is completed, e.g. the customer signs for the package 230 or other authentication processes are performed, then delivery can be confirmed by module 134 and a delivery notification is sent to the customer (at module 136). In some example embodiments, successful delivery is automatically determined by detection that the mobile automated fulfillment unit 102 has arrived and that the product(s) have been removed. New customer orders can continue to be fulfilled, concurrently or sequentially, following the same process until the end of the operational shift of the driver 208. New customer orders can be processed concurrently in some example embodiments, for example during travel by the mobile automated fulfillment unit 102 on-route to the delivery destination.

After the mobile automated fulfillment unit 102 moves back to the stock reloading station 112, product racks 217 are unloaded from the truck box 206 while the robotic arm 218 remains in the truck box 206. Product racks 217 may be automatically/autonomously unloaded on a guiding track (not shown) that takes the product racks 217 to the stock reloading station(s) 112 for refill of the products 230. The product racks 217 are then ready to be loaded again onto the truck box 206 for the next operational shift.

FIG. 3 shows the truck box 206 containing two product racks 217, to the right side and to the left side of the robotic arm 218, in an example embodiment. More or less product racks 217 may be contained in the truck box 206, in other example embodiments. In an example embodiment, the rack shelves 219 can be configured to have adjustable height and widths to accommodate different product dimensions. The rack shelves 219 and/or the floor of the truck box 206 can be equipped with a locking mechanism 220 to fix the rack shelves 219 to the floor of the truck box 206, for example while during active use of the truck 200 and when the truck is moving.

Reference is now made to FIGS. 4, 5 and 6, which illustrate an example product rack 217 in greater detail, in accordance with an example embodiment. As shown in FIG. 4, the product rack 217 includes four rack wheels 226 to facilitate mobility. There is also an automated cover 221 on the product rack 217 to prevent the products 230 from falling from the shelves. FIG. 5 shows separators 222 to segregate different products 230 and to allow the robotic arm 218 to retrieve the individual products 230.

Each shelf of each product rack 217 has a conveyer mechanism that moves a particular row of product 230 to the robotic arm 218. A surface of the conveyer mechanism can be friction enhanced with a coating or with surface ridges. In another example embodiment, not shown, a wire worm coil is used in each row to dispense products 230.

In an example embodiment, not shown, the conveyer mechanism of each shelf of each product rack 217 has a plurality of conveyor belts, such as two conveyor belts in some example embodiments. Each conveyor belt is mounted to rollers that are connected to a gear. In an example embodiment, the shelf itself does not have a motor to move the conveyor belts, rather, its movement is only triggered by the robotic arm 218 that has a clutch mechanism and motor (not shown) that engages one of the gears that moves one or more of the conveyor belts in order to move the product(s) 230. The purpose of having two parallel conveyor belts in each tray is to facilitate proper movement of products 230 regardless of their size or shape. This conveyor mechanism enables the system to have minimum number of motors (e.g. one or more motors on the robotic arm 218 only), as opposed to each shelf having its own motor to drive its respective conveyors.

FIG. 6 shows the rear side of the product rack 217 with a back door 225. For example, product 230 can be loaded onto the product rack 217 by opening the back door 225.

The robotic arm 218 is configured to carry products 230 from one or more of the product racks 217 to the truck cabin collection box 216. The robotic arm 218 is configured to move horizontally along a floor of the truck box 206 by way of guiding track 227. Referring to FIG. 3, in an example embodiment, the robotic arm 218 comprises a flat support surface 232 for handling retrieval and dispensing of regular shaped products. The flat support surface 232 is configured to move vertically along a vertical track 240 of the robotic arm 218. The flat support surface 232 includes a horizontal plane to support and carry one or more of the products 230. To dispense a product 230, the flat support surface 232 receives the product 230 from a specified row of a specified product rack 217.

In an example embodiment, the robotic arm 218 is located horizontally beside the product racks 217. When selecting a product 230, the robotic arm 218 moves horizontally along the guide track 227 to the particular product rack 217 and particular row. The flat support surface 232 moves vertically along the vertical track 240 to the particular row and of the product rack 217. The selected product 230 is moved along a row using the respective conveyer mechanism of the particular product rack 217, and the product 230 lands onto the flat support surface 232 using gravity.

In an example embodiment, the robotic arm 218 may dispense products 230 one at a time from the product racks 217 to the truck cabin collection box 216. In other example embodiments, the robotic arm 218 may dispense multiple products 230 at a time to the truck cabin collection box 216.

Figure 7:
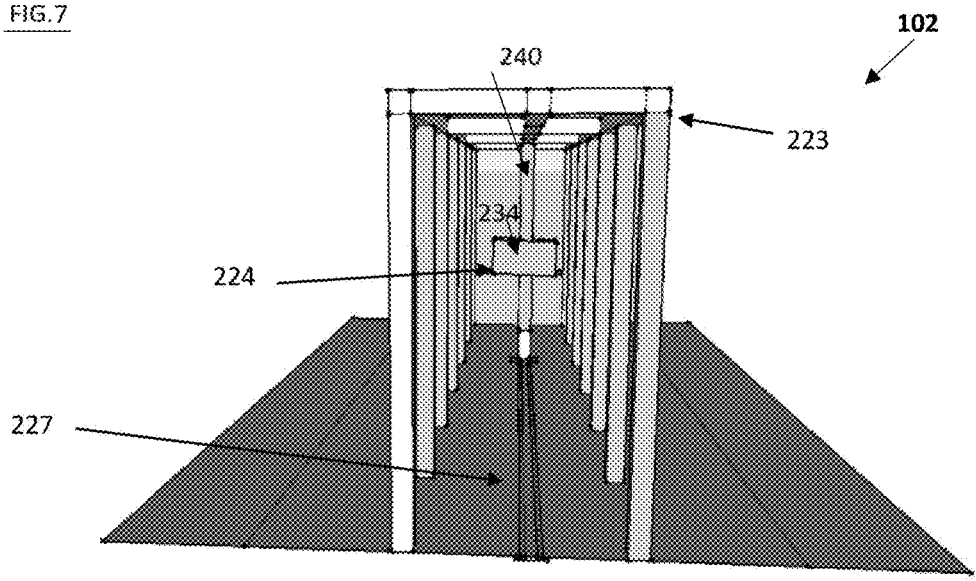
FIG. 7 illustrates a cutaway partial front view of a mobile automated fulfillment unit, in accordance with another example embodiment.
Figure 8:
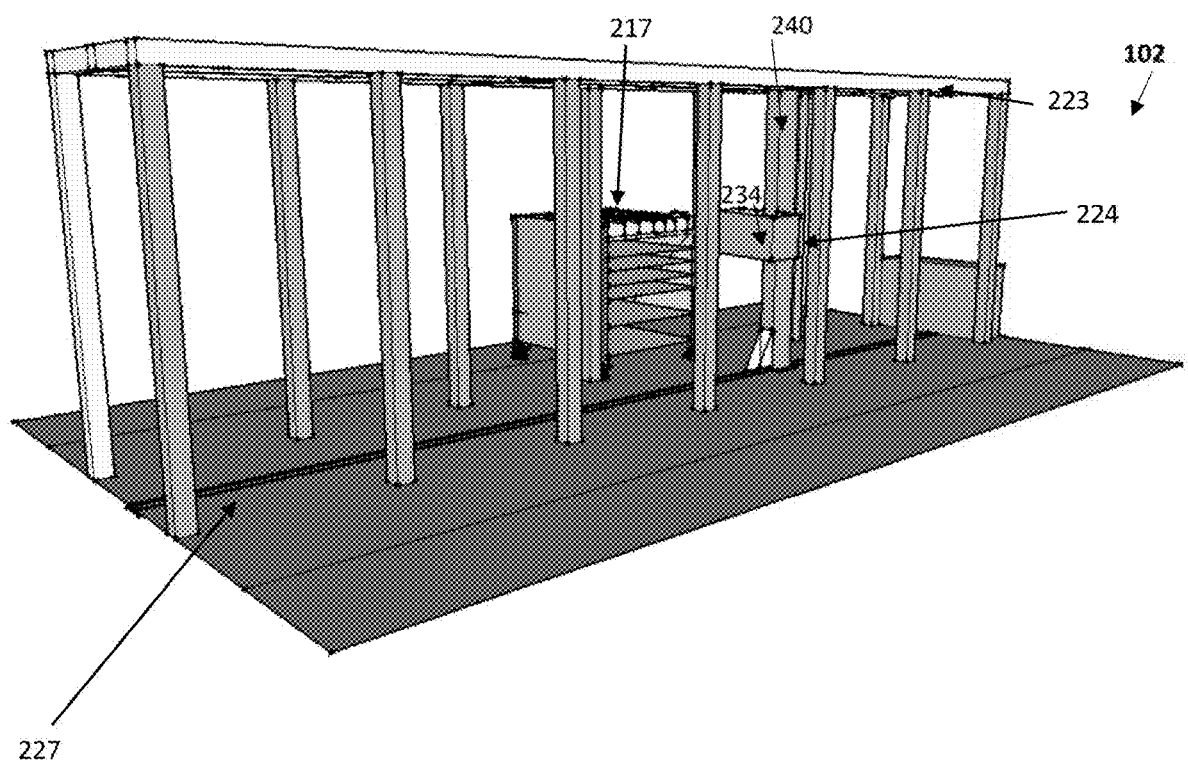
FIG. 8 illustrates a cutaway partial front perspective view of the mobile automated fulfillment unit of FIG. 7, further illustrating the product rack of FIG. 4.

Reference is now made to FIGS. 7 and 8, that illustrate a mobile automated fulfillment unit 102 in accordance with another example embodiments. Similar reference numbers are used for convenience of reference, as applicable. In FIGS. 7 and 8, the robotic arm 224 comprises a basket shaped container 234, having an open top that can handle collection of multiple products or irregular shaped products. To dispense the product 230, the robotic arm 218 is aligned to a particular product rack 217, and associated row, and the conveyer mechanism moves the product 230 along its respective row and the product 230 lands into the basket shaped container 234 using gravity.

In some example embodiments, referring to FIG. 8, when retrieving a product 230 from a product rack 217 to the robotic arm 224, a sensor or scanner (not shown) can be used to check if the product 230 is properly collected. Examples of the sensor or the scanner include a camera, a weight scale, a barcode scanner, an optical sensor, etc. The basket shaped container 234 is used to collect received products 230 and dispense them to the driver cabin 215. The robotic arm 224 can function when the truck 200 is stationary and when the truck 200 is moving, to dispense the products 230 while the truck 200 is moving, in example embodiments. In an example embodiment, the driver 208 does not need to manually control the robotic arm 224 to fulfill a customer order, but rather the robotic arm 224 is automatically deployed to retrieve the product(s) 230 once the customer order is received by the mobile automated fulfillment unit 102.

Figure 9:
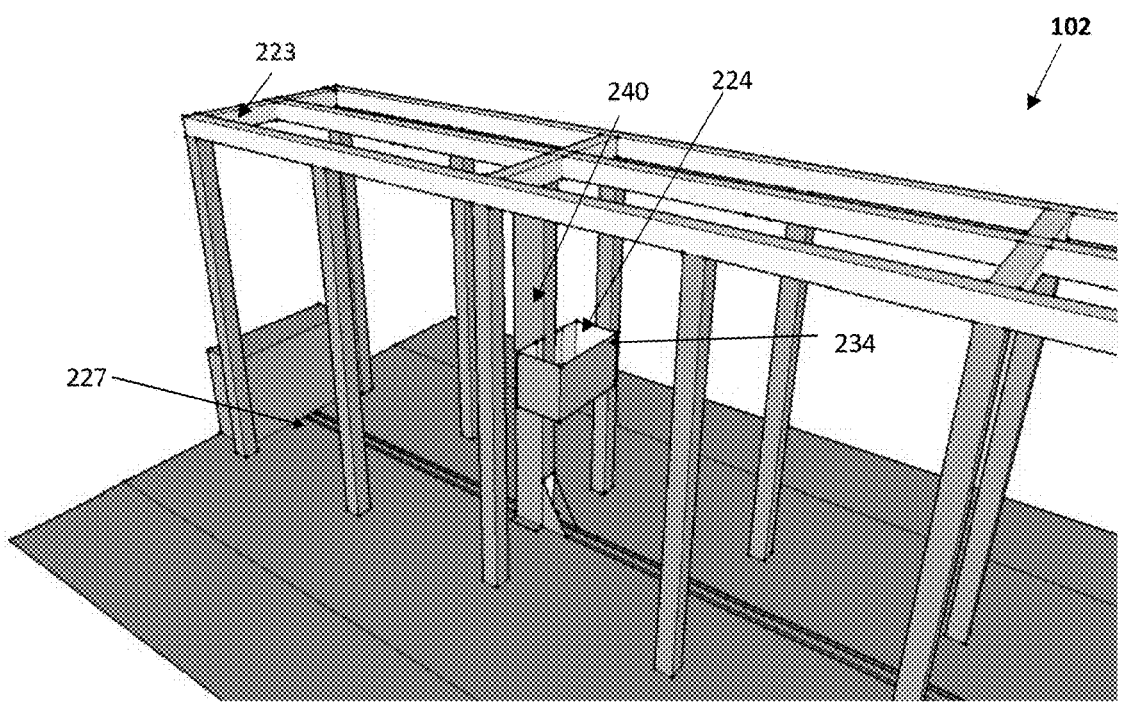
FIG. 9 illustrates a cutaway partial rear perspective view of the mobile automated fulfillment unit of FIG. 7.

FIG. 7 and FIG. 9 show a skeleton frame structure 223 fixed on the truck 200. The skeleton frame structure 223 provides greater stability to the mobile automated fulfillment unit 102 and also provides an upper track, similar to the guiding track 227. The skeleton frame structure 223 comprises a number of beams, that have spaces there between that allow the robotic arm 224 to access the product racks 217. The beams of the skeleton frame structure 223 can also define spaces for parking of the product racks 217, as shown in FIG. 8, where the product rack 217 is parked between two vertical beams.

Based on the number, size and capacity of product racks 217, some example embodiments can be configured to carry between 700 to 2000 stock keeping units (SKUs) of different products, depends on items mix.

Referring again to FIG. 10, if a customer is located in an inactive range (e.g. no mobile automated fulfillment units 102 or associated range 110), the app of the mobile communication device 104 can be configured to provide the customer with the ability to add products to a wish list so that the customer can buy the products as soon as the range becomes active.

Overlapping ranges 110 allow the customer to access and buy product from two or more mobile automated fulfillment units 102. In some example embodiments, the cloud server 106 decides which mobile automated fulfillment unit 102 is to fulfill the order. This can be based on any or all of distance, time of arrival, amount of remaining inventory, balancing of remaining inventory between mobile automated fulfillment units 102, etc. In some example embodiments, the customer can use the customer interface 105 to select a desired mobile automated fulfillment unit 102. In some example embodiments, the customer order (module 126) is sent to all mobile automated fulfillment units 102 having the geographical range 110, and the first driver 208 of a mobile automated fulfillment unit 102 that accepts the customer order is the one responsible for fulfilling the order.

Example embodiments can generally provide an autonomous automated store that handles order fulfillment and last mile delivery simultaneously using mobile technology and dynamic product catalog that shows products availability based on trucks proximity from customers.

In another example embodiment, the stock reloading station 112 is not at a fixed warehouse. Rather, the stock reloading station 112 is a mobile satellite warehouse on a vehicle that can perform package sorting process on the move to improve the process of package delivery services. In an example embodiment, the stock reloading station 112 includes a vehicle that has a larger capacity than each individual mobile automated fulfillment unit 102. The stock reloading station 112 can be configured to travel to meet the particular mobile automated fulfillment unit 102 at a mutually convenient location when the mobile automated fulfillment unit 102 requires refill of inventory.

An example embodiment is a mobile automated storage and retrieval system 100 that is capable of dispensing products 230 on the move in response to customer request and location.

An example embodiment is a supply chain system where order fulfillment and last mile delivery are combined with capacity to store and process thousands of products.

An example embodiment is a mobile automated storage and retrieval system 100 that dispenses products in the driver cabin 215 to save item picking time and optimize the delivery process.

In accordance with an example embodiment, there is provided a non-transitory computer-readable medium containing instructions executable by a processor for performing any one of or all of the described modules or methods. In accordance with an example embodiment, there is provided a processor-implemented method for performing any one of or all of the described functions or modules described with respect to any of the processors.

In the described methods, the boxes may represent events, steps, functions, processes, modules, state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" ("transmitting") or "receiving" could be interchanged depending on the perspective of the particular device.

While some example embodiments have been described, at least in part, in terms of methods, a person of ordinary skill in the art will understand that some example embodiments are also directed to the various components for performing at least some of the aspects and features of the described processes, be it by way of hardware components, software or any combination of the two, or in any other manner. Moreover, some example embodiments are also directed to a pre-recorded storage device or other similar computer-readable medium including program instructions stored thereon for performing the processes described herein. The computer-readable medium includes any non-transient storage medium, such as RAM, ROM, flash memory, compact discs, USB sticks, DVDs, HD-DVDs, or any other such computer-readable memory devices.

It will be understood that the devices described herein include one or more processors or controllers and associated memory. The memory may include one or more application program, modules, or other programming constructs containing computer-executable instructions that, when executed by the one or more processors, implement the methods or processes described herein.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprises of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A mobile automated on-demand electronic commerce fulfillment unit, comprising:
a vehicle having a storage for storing products, a wall, and a compartment separated from the storage by the wall, the stored products being unassigned to any delivery destination prior to receiving any customer order;
a robotic conveyor mechanism;
a communication subsystem configured for at least mobile communication; and
at least one controller configured to:
transmit, through the communication subsystem, a present location of the vehicle,
receive through the communication subsystem a customer order for a delivery destination when the present location of the vehicle is within a specified range of the delivery destination and when the vehicle has already stored one or more products of the customer order, the customer order including: identification of the one or more of the products, and the delivery destination of the one or more products,
assign the one or more products which were already stored in the vehicle to the delivery destination,
control the robotic conveyor mechanism to move the one or more products from the storage to the compartment, wherein the robotic conveyor mechanism is controlled at least partly when the vehicle is moving,
verify that the vehicle has reached the delivery destination and that the one or more products have been removed from the vehicle, and
transmit, through the communication subsystem, information that the one or more products are no longer contained in the vehicle.

2. The mobile automated on-demand electronic commerce fulfillment unit as claimed in claim 1, wherein the robotic conveyor mechanism is controlled at least partly when the vehicle is on-route to the delivery destination.

3. The mobile automated on-demand electronic commerce fulfillment unit as claimed in claim 1, wherein the customer order is received from a server.

4. The mobile automated on-demand electronic commerce fulfillment unit as claimed in claim 1, wherein the information that the one or more products are no longer contained in the vehicle is transmitted to a server.

5. The mobile automated on-demand electronic commerce fulfillment unit as claimed in claim 1, wherein the compartment is located at a front of the vehicle.

6. The mobile automated on-demand electronic commerce fulfillment unit as claimed in claim 1, further comprising a window at the wall for access to the compartment from the storage.

7. The mobile automated on-demand electronic commerce fulfillment unit as claimed in claim 1, wherein the vehicle further comprises a driver cabin, and wherein the compartment is located in the driver cabin.

8. The mobile automated on-demand electronic commerce fulfillment unit as claimed in claim 1, wherein the specified range comprises a specified distance from the vehicle.

9. The mobile automated on-demand electronic commerce fulfillment unit as claimed in claim 1, wherein the specified range comprises a specified time of travel of the vehicle to the delivery destination.

10. The mobile automated on-demand electronic commerce fulfillment unit as claimed in claim 1, wherein the vehicle is an autonomous vehicle, wherein the at least one controller is further configured to control the vehicle to move to the delivery destination.

11. The mobile automated on-demand electronic commerce fulfillment unit as claimed in claim 1, wherein the customer order is received when the vehicle is moving.

12. The mobile automated on-demand electronic commerce fulfillment unit as claimed in claim 1, wherein the customer order is received when the vehicle is away from a stock reloading station.

13. The mobile automated on-demand electronic commerce fulfillment unit as claimed in claim 1, wherein the customer order is received when the vehicle is on-route to a second delivery destination different than the delivery destination.

14. The mobile automated on-demand electronic commerce fulfillment unit as claimed in claim 1, wherein the at least one controller is configured to, when the vehicle is moving, on-route to a second delivery destination, or away from a stock reloading station, print at least one label of the customer order for affixing to the one or more products.

15. The mobile automated on-demand electronic commerce fulfillment unit as claimed in claim 1, wherein the robotic conveyor mechanism comprises a robotic arm.

16. The mobile automated on-demand electronic commerce fulfillment unit as claimed in claim 15, further comprising a vertical track and/or a horizontal track in the storage, wherein the robotic arm is controllable to move along the vertical track and/or the horizontal track in the storage.

17. The mobile automated on-demand electronic commerce fulfillment unit as claimed in claim 15, wherein the robotic arm comprises a horizontally flat support surface.

18. The mobile automated on-demand electronic commerce fulfillment unit as claimed in claim 15, wherein the robotic arm comprises a basket shaped container.

19. The mobile automated on-demand electronic commerce fulfillment unit as claimed in claim 1, further comprising one or more product racks in the storage, each product rack comprising shelves for storing of the products, each of the product racks being individually removable from the storage of the vehicle.

20. The mobile automated on-demand electronic commerce fulfillment unit as claimed in claim 19, wherein each shelf comprises at least one conveyor belt for moving one or more of the products.

21. The mobile automated on-demand electronic commerce fulfillment unit as claimed in claim 19, wherein the at least one controller is further configured to identify and control each respective conveyor belt that stores each of the identified products.

22. The mobile automated on-demand electronic commerce fulfillment unit as claimed in claim 19, wherein the at least one controller is further configured to identify which shelf of which product rack stores each of the identified products, for said moving of the one or more products from the storage to the compartment.

23. The mobile automated on-demand electronic commerce fulfillment unit as claimed in claim 19, wherein each product rack comprises wheels.

24. A mobile automated storage and retrieval system, comprising:
- a plurality of mobile automated on-demand electronic commerce fulfillment units which each store products;
- a server including a communication subsystem, memory and at least one processor, the server configured to:
  - determine a delivery destination,
  - determine which mobile automated on-demand electronic commerce fulfillment units are within a specified range of the delivery destination,
  - determine which of the products are unassigned to any delivery destination and are stored in the determined mobile automated on-demand electronic commerce fulfillment units that are within the specified range,
  - transmit to a computer device a communication that identifies at least one of the determined products that are within the specified range,
  - receive a customer order for one or more products of the determined products that are within the specified range,
  - assign the one or more products to the delivery destination,
  - transmit the customer order, including the delivery destination, to at least one of the mobile automated on-demand electronic commerce fulfillment units, and
  - receive, after delivery of the one or more products, information from one of the mobile automated on-demand electronic commerce fulfillment units that the one or more products are no longer contained in the mobile automated on-demand electronic commerce fulfillment unit,
- wherein each of the plurality of mobile automated on-demand electronic commerce fulfillment units is the mobile automated on-demand electronic commerce fulfillment unit as claimed in claim 1.

25. The mobile automated storage and retrieval system as claimed in claim 24, wherein the server is a cloud server.

26. A method for controlling a mobile automated on-demand electronic commerce fulfillment unit, the mobile automated on-demand electronic commerce fulfillment unit including a vehicle having a storage for storing products, a wall, a compartment separated from the storage by the wall, a robotic conveyor mechanism, and a communication subsystem configured for at least mobile communication, the stored products being unassigned to any delivery destination prior to receiving any customer order, the method being performed by at least one controller and comprising:
- transmitting, through the communication subsystem, a present location of the vehicle;
- receiving through the communication subsystem a customer order for a delivery destination when the present location of the vehicle is within a specified range of the delivery destination and when the vehicle has already stored one or more products of the customer order, the customer order including:
  - identification of the one or more of the products, and
  - the delivery destination of the one or more products;
  - assigning the one or more products which were already stored in the vehicle to the delivery destination,
- controlling the robotic conveyor mechanism to move the one or more products from the storage to the compartment, wherein the robotic conveyor mechanism is controlled at least partly when the vehicle is moving;
- verifying, through the communication subsystem, that the vehicle has reached the delivery destination and that the one or more products have been removed from the vehicle; and
- transmitting information that the one or more products are no longer contained in the vehicle.

* * * * *